United States Patent [19]

Kiriloff

[11] Patent Number: 4,747,306

[45] Date of Patent: May 31, 1988

[54] TEMPERATURE COMPENSATING TANGENT ASSEMBLY FOR A DIAPHRAGM GAS METER

[75] Inventor: William P. Kiriloff, Philadelphia, Pa.

[73] Assignee: American Meter Company, Philadelphia, Pa.

[21] Appl. No.: 864,184

[22] Filed: May 16, 1986

[51] Int. Cl.⁴ ............... G01F 3/20; G01F 15/04
[52] U.S. Cl. .................................. 73/233; 73/281
[58] Field of Search .................. 73/233, 281

[56] References Cited

U.S. PATENT DOCUMENTS

| 3,177,713 | 4/1965 | Hutchison et al. | 73/281 |
| 3,177,714 | 4/1965 | Mayeran | 73/281 |
| 4,538,458 | 9/1985 | Bruce et al. | 73/281 X |

FOREIGN PATENT DOCUMENTS

| 536708 | 5/1957 | Canada | 73/281 |
| 1364247 | 8/1974 | United Kingdom | 73/233 |

Primary Examiner—Herbert Goldstein
Attorney, Agent, or Firm—David L. Davis

[57] ABSTRACT

A temperature compensating tangent assembly for a diaphragm gas meter wherein the movement of the tangent wrist is controlled to be other than linearly radial in order to maintain the timing of the valves.

5 Claims, 3 Drawing Sheets

TEMPERATURE COMPENSATING TANGENT ASSEMBLY FOR A DIAPHRAGM GAS METER

DESCRIPTION

BACKGROUND OF THE INVENTION

This invention relates to diaphragm gas meters and, more particularly, to a temperature compensating tangent assembly for use therewith.

Positive displacement diaphragm gas meters typically are provided with a tangent assembly which drivingly couples the diaphragm driven flag assembly to a crank which is in turn coupled to open and close the slide valves of the meter. One complete cycle of the meter causes a single rotation of the tangent assembly. The stroke of each diaphragm is determined by the distance from the center of rotation of the tangent assembly to the wrist of the tangent assembly. This is known as the "tangent throw". The tangent throw therefore determines the gas volume passed through the meter for each diaphragm stroke.

As the temperature of the gas increases, its volume increases for the same energy content. It is therefore desirable to increase the volume of gas passing through the meter for one complete cycle of the meter as the temperature of the gas increases. It is known to provide temperature compensating tangent assemblies which increase the tangent throw as the gas gets warmer, thereby requiring a greater volume of gas for each cycle of the meter.

In the past, various arrangements have been proposed to provide a temperature compensating tangent assembly which varies the tangent throw in accordance with variations in the temperature of the gas. It was previously believed that it was desirable to maintain as linear as possible the radial path of movement along which the wrist is adjusted toward and away from the axis about which it rotates. However, the Applicant herein has discovered that this linearity of movement adversely affects the timing of the meter valves. It is therefore an object of the present invention to provide a temperature compensating tangent assembly for a diaphragm gas meter which keeps the meter timed correctly over a wide range of temperatures.

SUMMARY OF THE INVENTION

The foregoing, and additional, objects are attained in accordance with the principles of this invention by providing a temperature compensating tangent assembly which includes a bimetal assembly to control the position of the tangent wrist in response to temperature variations and formed in the shape of an open loop configured so that the path of movement of the tangent wrist is along a nonradial line with respect to the tangent axis so as to maintain the valve timing substantially without change.

In accordance with an aspect of this invention, the bimetal assembly comprises first and second reversely and serially connected bimetal elements.

In accordance with a further aspect of this invention, the bimetal elements are configured as circular arcs, together extending less than 360° and oriented with respect to each other to form a C-shaped loop.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

In the past, when designing a temperature compensating tangent assembly for a diaphragm meter, great concern has been evidenced to maintain as linear as possible the radial path of movement along which the tangent wrist is adjusted toward and away from the axis about which it rotates. U.S. Pat. No. 4,538,458 discusses in detail many attempts to achieve this allegedly desirable linearity of motion. However, contrary to these prior efforts to achieve linearity, the Applicant herein has found that, under wide temperature excursions, valve timing is adversely affected by a strictly radial motion of the tangent wrist. This adverse effect is illustrated in FIG. 1.

Figure 1:
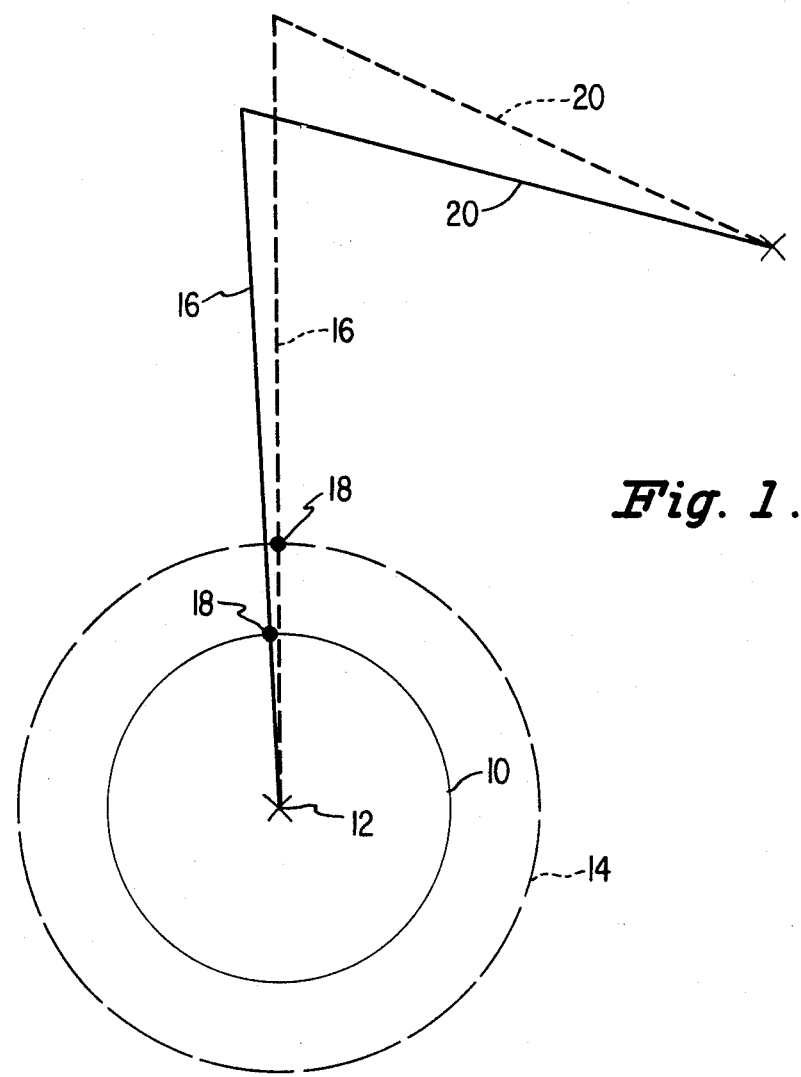
FIG. 1 illustrates the relationships of the long and short flag arms of a diaphragm gas meter with respect to different tangent throws.

Referring now to FIG. 1, the solid inner circle 10 illustrates the path of movement of the tangent wrist about the axis of rotation 12 at the base temperature and the broken outer circle 14 illustrates the path of movement of the tangent wrist at an elevated temperature. At the base temperature, when the diaphragm is at the end of its stroke, the short flag arm 16, as shown by the solid line, forms a straight line to the tangent center 12 through its point of connection 18 to the tangent wrist and the long flag arm 20 is at its rearmost position. At this time in the meter cycle, the valving must switch so that the diaphragm can go from intake to exhaust. With an increase in temperature, the tangent throw must increase, assuming there is temperature compensation. As shown by the broken lines, at the end of the diaphragm stroke, the short flag arm 16 must again form a straight line through the tangent wrist 18 to the tangent center 12, since the long flag arm 20 is again at its rearmost position. Therefore, at this larger radius, the tangent wrist 18 must move to the position along the broken lines instead of radially outward along the solid lines from its position at the base temperature. This allows the diaphragm to be at the end of its stroke when the valves are set at the same position they were in at the base temperature. The angular difference between the solid and broken lines is the timing error that results when the tangent wrist is constrained to move radially. In accordance with the Applicant's invention, the temperature compensating tangent assembly is so configured that, in response to temperature variations, the tangent wrist follows a curve that automatically keeps the meter timed correctly over a range of temperatures between −30° F. and +140° F.

Figure 2:
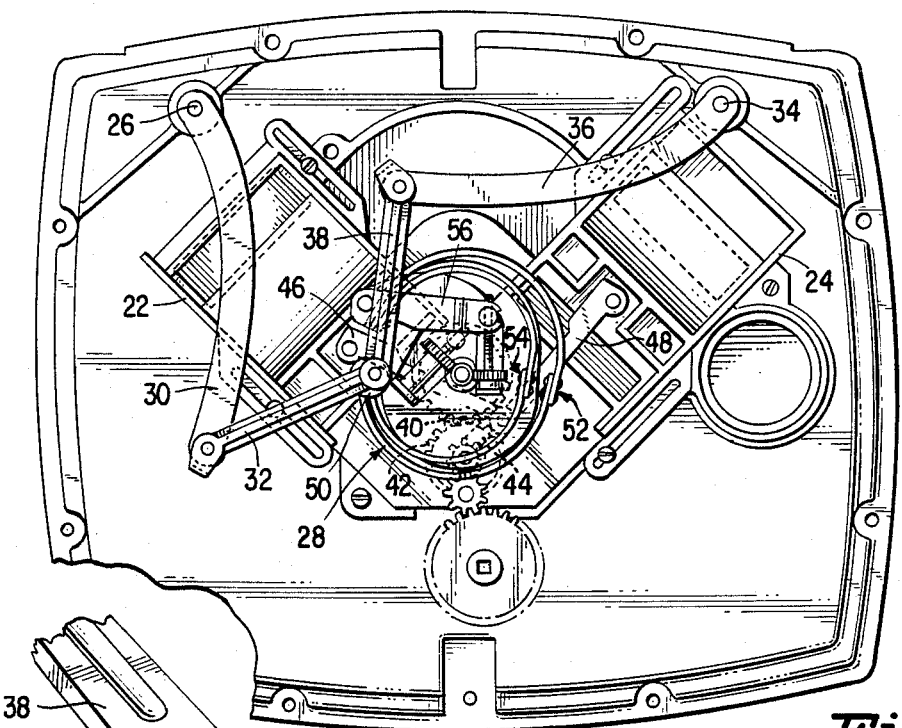
FIG. 2 is a top plan view of a diaphragm gas meter valve table showing an illustrative temperature compensating tangent assembly constructed in accordance with the principles of this invention.
Figure 3:
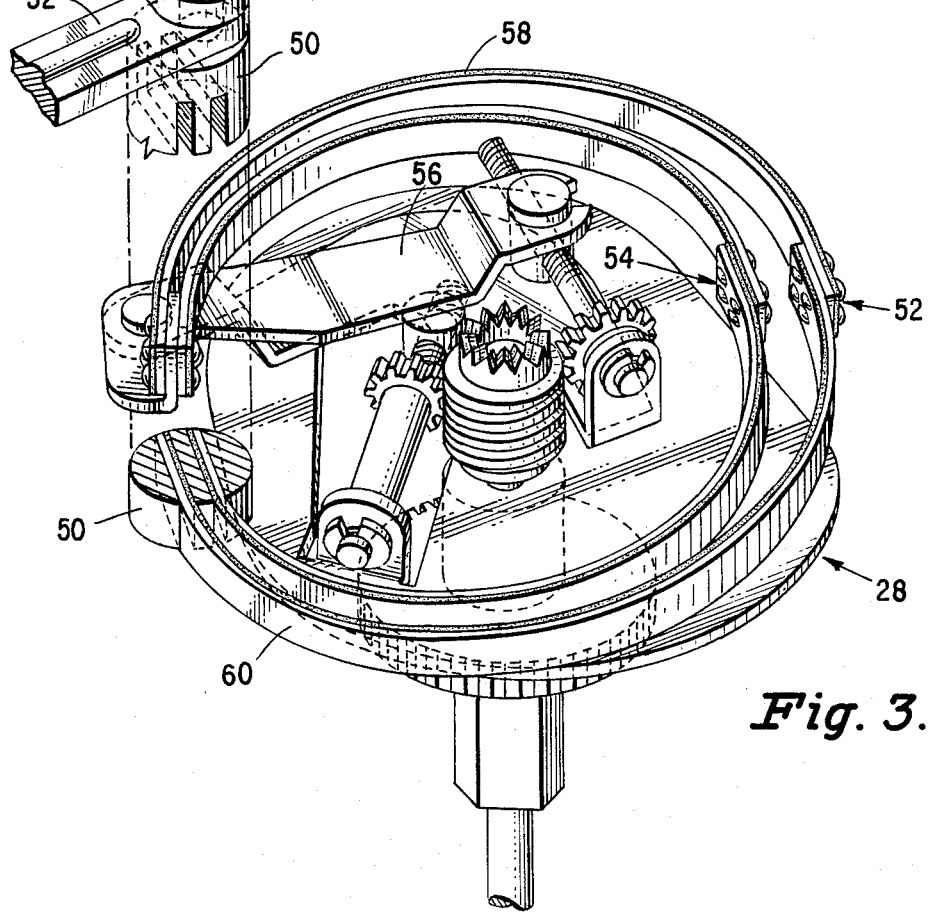
FIG. 3 is an enlarged perspective view of the temperature compensating tangent assembly shown in FIG. 2.

FIGS. 2 and 3 illustrate an improved tangent assembly which maintains the valve timing as the temperature varies. In FIG. 2, the improved temperature compensator is shown installed in a tangent assembly in a meter of the type disclosed in the copending application of Irwin A. Hicks, DIAPHRAGM GAS METER, Ser. No. 863,226, filed May 14, 1986 and assigned to the assignee of this invention. Briefly described, this meter includes a first transfer valve 22 associated with a first diaphragm (not shown) and a second transfer valve 24 associated with a second diaphragm (not shown). The first diaphragm has its movable end connected to the flag rod 26 which in turn is connected to the tangent assembly 28 via the long flag arm 30 and the short flag arm 32. Similarly, the movable end of the second diaphragm is connected to the flag rod 34 which in turn is connected to the tangent assembly 28 via the long flag arm 36 and the short flag arm 38. The valves 22 and 24 are connected to the tangent assembly 28 through the gears 40 and 42 and the crank 44 to which are connected the valve arms 46 and 48. The tangent assembly 28 includes a mechanism for adjusting the stroke and timing, illustratively of the type disclosed in U.S. Pat. No. 4,520,676.

According to the present invention, the short flag arms 32 and 38 are connected to the tangent assembly 28 via the tangent wrist 50 connected to the free ends of the temperature compensating bimetal assemblies 52 and 54, the other ends of which are connected to the stroke plate 56 of the tangent assembly 28.

The bimetal assembly 52 is made up of a first bimetal element 58 and a second bimetal element 60 attached with their high and low expansion sides reversed. The bimetal assembly 54 is similarly constructed and is for the purpose of increasing the stiffness of the compensator. The bimetal element 58 has its high expansion material on the outside so that, as the temperature increases, it contracts into a smaller radius. The bimetal element 60 has its high expansion material on the inside and, as the temperature increases, it expands to a larger radius. The net result is that the tangent wrist 50 is moved away from the axis of rotation of the tangent assembly 28.

In accordance with this invention, each of the bimetal elements is configured as a circular arc, with a short straight continuing segment at each end. The elements 58 and 60 are connected at an overlap of these straight segments and together extend less than 360° to form an open C-shaped loop. The other straight segments of the elements 58 and 60 are connected to the stroke plate 56 and the tangent wrist 50, respectively. Similar construction details apply to the bimetal assembly 54.

Figure 4:
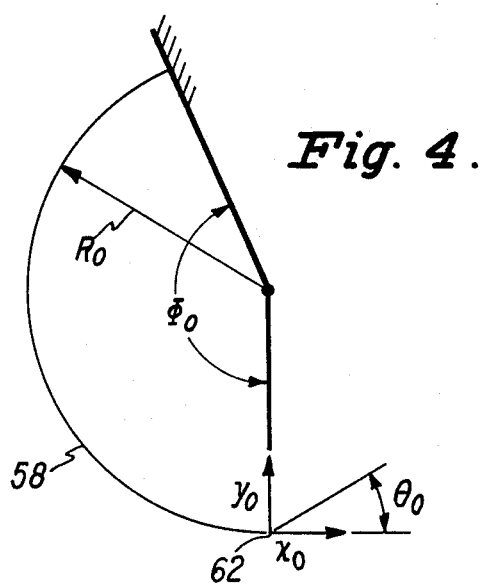
FIGS. 4, 5, 6 and 7 are diagrams useful in understanding the mathematics which describe the motion of the tangent wrist in response to temperature variations.
Figure 5:
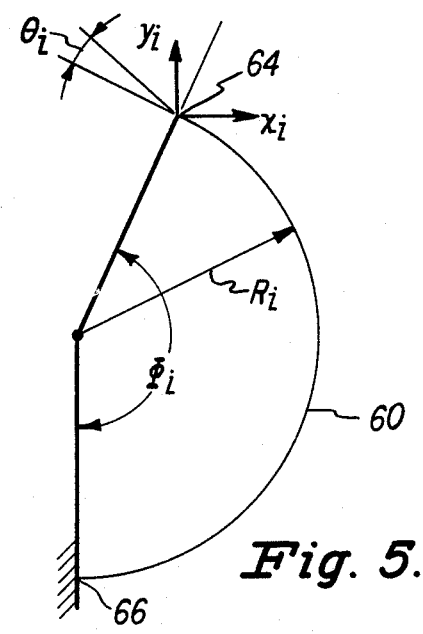

Referring to FIG. 4, where $R_o$ is the radius of curvature of the bimetal element 58 and $\Phi_o$ is its angle of arc (in radians), the equations of motion of the free end 62 may be shown to be:

$$x_o = \frac{2K_o \Delta T R_o^2}{t_o} [\Phi_o - \sin \Phi_o]; \quad (1)$$

$$y_o = \frac{2K_o \Delta T R_o^2}{t_o} [1 - \cos \Phi_o]; \text{ and} \quad (2)$$

$$\theta_o = \frac{2K_o \Delta T R_o}{t_o} \Phi_o; \quad (3)$$

where
$K_o$ is the activity factor of the bimetal 58
$\Delta T$ is the temperature change and
$t_o$ is the thickness of the bimetal 58.
Similarly, referring to FIG. 5, where the variables are the same as in FIG. 4, but with the subscript "i" replacing the subscript "o", the equations of motion of the end 64, assuming the end 66 is fixed, are as follows:

$$x_i = \frac{2K_i \Delta T R_i^2}{t_i} [\sin \Phi_i - \Phi_i \cos \Phi_i]; \quad (4)$$

$$y_i = \frac{2K_i \Delta T R_i^2}{t_i} [1 - \Phi_i \sin \Phi_i - \cos \Phi_i]; \text{ and} \quad (5)$$

$$\theta_i = \frac{2K_i \Delta T R_i}{t_i} \Phi_i. \quad (6)$$

the resultant motion (X,Y) of the tangent wrist 50 at the free end 64 of the second bimetal element 60 when the bimetal elements 58 and 60 are serially and reversely connected is the sum of the individual motions of the two elements, as set forth above, plus the motion due to their interaction. This interaction motion $(X_\theta, Y_\theta)$ is the rigid body rotation of element 60 due to the change in slope of the element 58 at the point of attachment to the element 60.

Figure 6:
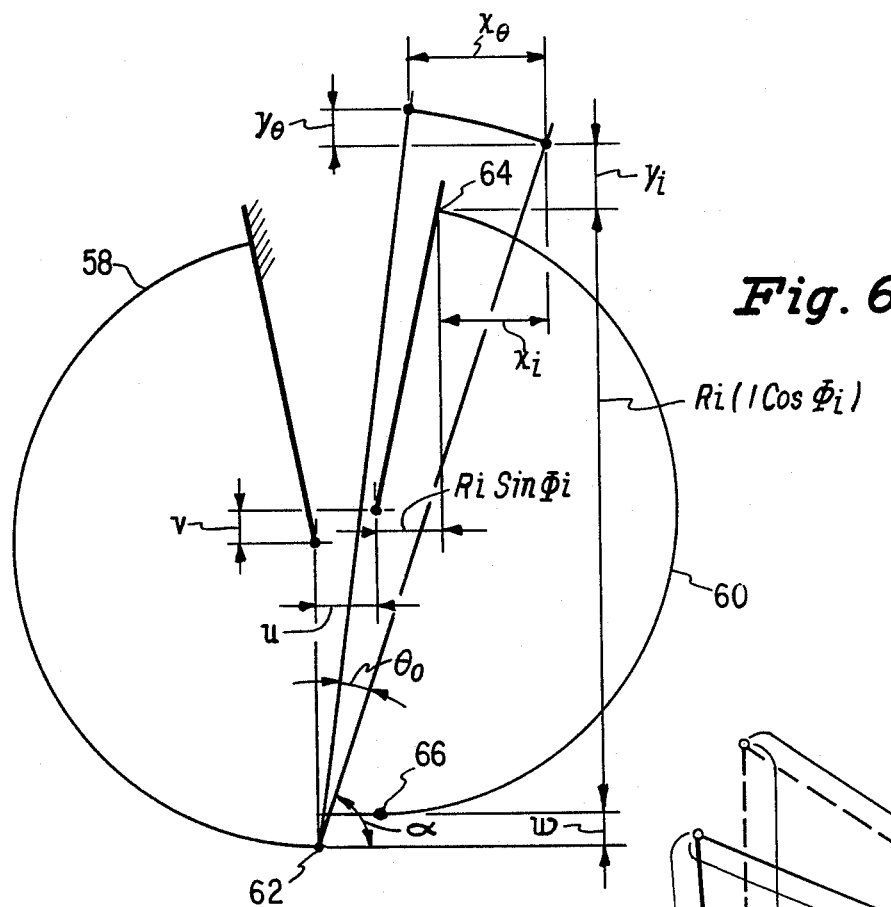

Referring to FIG. 6, where "u" is the distance along the x-axis between the centers of curvature of the two bimetal elements 58 and 60 (also the length of the overlapped attachment of the elements), "v" is the distance along the y-axis between the centers of curvature of the two bimetal elements 58 and 60, and "w" is the distance between the centerlines of the two bimetal elements 58 and 60 at the point of attachment to each other, the interaction motion can be shown to be $$x_\theta = C\cos(\gamma + \theta) - [R_i \sin \Phi_i + u + x_i] \text{ and} \quad (7)$$

$$y_\theta = C\sin(\gamma + \theta) - [R_i(1 - \cos \Phi_i) + w + y_i] \text{ where} \quad (8)$$

$$\gamma = \tan^{-1}\left( \frac{R_i(1 - \cos \Phi_i) + w + y_i}{R_i \sin \Phi_i + u + x_i} \right) \text{ and} \quad (9)$$

$$C = \sqrt{[R_i(1 - \cos \Phi_i) + w + y_i]^2 + [R_i \sin \Phi_i + u + x_i]^2}. \quad (10)$$

The resultant motion is then $$X = x_o + x_i + x_\theta \quad (11)$$

and $$Y = y_o + y_i + y_\theta. \quad (12)$$

Figure 7:
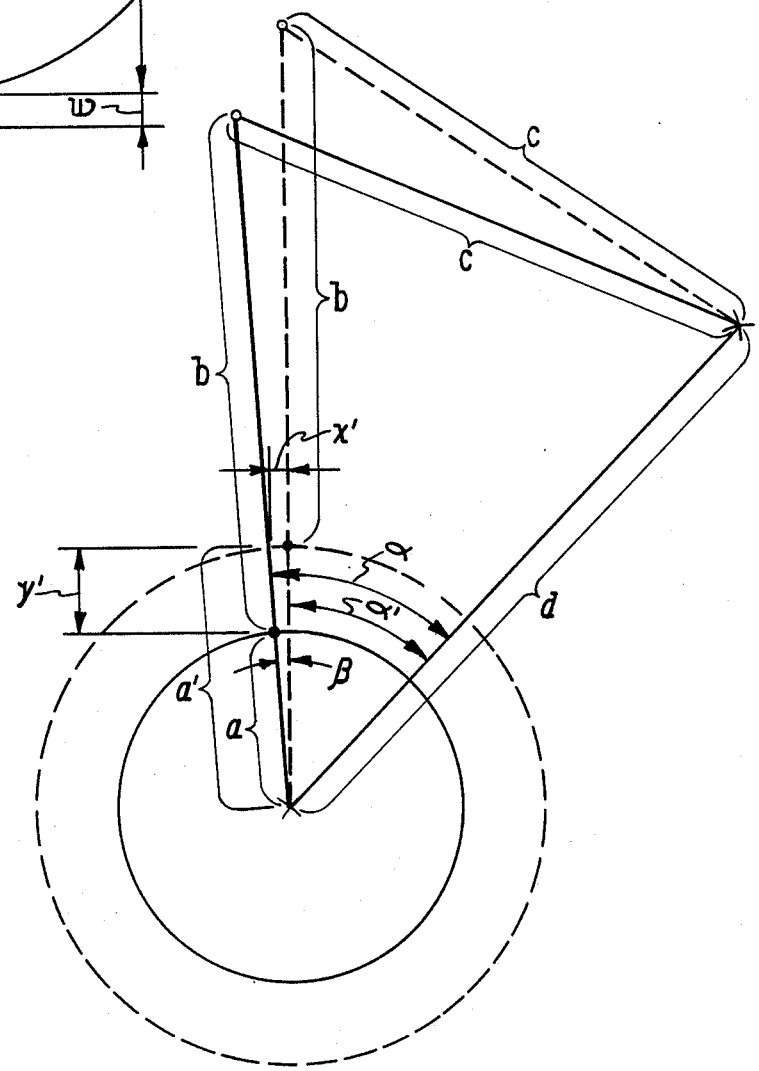

The desired motion (X',Y') is calculated by examining FIG. 7, which repeats FIG. 1 with different nomenclature. In FIG. 7, "a" is the tangent length at the base temperature; "a'" is the tangent length at other than the base temperature; "b" is the short flag arm length; "c" is the long flag arm length; and "d" is the distance from the tangent center to the flag rod bearing. Then:

$$\alpha = \cos^{-1}\left( \frac{(b + a)^2 + d^2 - c^2}{2d(b + a)} \right); \quad (13)$$

$$\alpha^1 = \cos^{-1}\left( \frac{(b + a^1)^2 + d^2 - c^2}{2d(b + a')} \right); \text{ and} \quad (14)$$

$$\beta = \alpha - \alpha'. \quad (15)$$

The desired resultant motion is then:

$$X' = a' \sin \beta; \tag{16}$$

and $$Y' = a' \cos \beta - a. \tag{17}$$

The resultant motion defined in equations (11) and (12) is then adjusted to match the desired motion defined in equations (16) and (17) so that the tangent throw is increased without causing a timing change in the valves. This is accomplished by choosing appropriate values of $R_i$, $R_o$, $\Phi_i$, $\Phi_o$, $t_i$, $t_o$, u, v, and w for both of the bimetal assemblies 52 and 54 so that they have substantially identical free end motion as to work in concert with each other.

Accordingly, there has been disclosed an improved temperature compensating tangent assembly for a diaphragm gas meter. It is understood that the above-described embodiment is merely illustrative of the application of the principles of this invention. Numerous other embodiments may be devised by those skilled in the art without departing from the spirit and scope of this invention, as defined by the appended claims. Thus, while each of the disclosed bimetal assemblies has been shown as comprising a pair of reversely connected bimetals, this is only necessary where it is required to have a large tangent throw, since reversely connected bimetals both expand the thermal activity and give an exact timing correction. In the environment of a small meter, a single bimetal open loop can be utilized to approximate the correct timing curve (equations (16) and (17)).

I claim:

1. In a diaphragm gas meter tangent assembly which rotates about an axis to drive the meter valves and includes a tangent wrist connected to the meter flag assembly, a temperature compensating assembly for varying the radius of movement of said tangent wrist from said axis in accordance with variations in the temperature of the metered gas, comprising:

a first bimetal element having a first end connected to said tangent assembly to rotate with said tangent assembly around said axis; and a second bimetal element having a first end connected to said first bimetal element second end and a second end connected to said tangent wrist;

said first and second bimetal elements being configured as circular arcs, together extending less than 360° and oriented with respect to each other to form an open C-shaped loop, and having the relative placements of their high and low expansion sides reversed with respect to each other and so configured that the path of movement of said tangent wrist with respect to said axis in response to temperature variations is along a nonlinear curve so as to maintain the valve timing substantially without change as said radius changes.

2. The assembly according to claim 1 wherein said first bimetal element second end and said second bimetal element first end each includes a straight segment extending as a continuation of the respective circular arc, said first and second bimetal elements being connected at an overlap of said straight segments.

3. The assembly according to claim 2 wherein said first bimetal element first end includes a straight segment extending as a continuation of its circular arc, said first bimetal element being connected to said tangent assembly at said first end straight segment.

4. The assembly according to claim 2 wherein said second bimetal element second end includes a straight segment extending as a continuation of its circular arc, said second bimetal element being connected to said tangent wrist at said second end straight segment.

5. The assembly according to claim 1 further including a second pair of bimetal elements of smaller dimension than the other pair of bimetal elements and configured and connected the same so as to form a second open C-shaped loop within the other C-shaped loop and having substantially identical free end motion as to work in concert with each other.

* * * * *